(12) United States Patent
Etoh et al.

(10) Patent No.: US 9,319,554 B2
(45) Date of Patent: Apr. 19, 2016

(54) IMAGE READING DEVICE, IMAGE FORMING APPARATUS, AND IMAGE READING METHOD

(71) Applicants: Kohya Etoh, Kanagawa (JP); Masafumi Kishi, Kanagawa (JP)

(72) Inventors: Kohya Etoh, Kanagawa (JP); Masafumi Kishi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 14/690,650

(22) Filed: Apr. 20, 2015

(65) Prior Publication Data
US 2015/0341523 A1    Nov. 26, 2015

(30) Foreign Application Priority Data

May 22, 2014    (JP) ................................ 2014-106368

(51) Int. Cl.
*H04N 1/04* (2006.01)
*H04N 1/10* (2006.01)
*H04N 1/028* (2006.01)
(Continued)

(52) U.S. Cl.
CPC ............ *H04N 1/1039* (2013.01); *H04N 1/0071* (2013.01); *H04N 1/00737* (2013.01); *H04N 1/00896* (2013.01); *H04N 1/00928* (2013.01); *H04N 1/02815* (2013.01); *H04N 1/0473* (2013.01); *H04N 2201/0471* (2013.01); *H04N 2201/04713* (2013.01); *H04N 2201/04731* (2013.01); *H04N 2201/04755* (2013.01); *H04N 2201/04791* (2013.01); *H04N 2201/04794* (2013.01)

(58) Field of Classification Search
CPC ............................ H04N 1/039; H04N 1/02815
USPC ......... 358/486, 488, 475, 474, 497, 496, 505; 399/211, 212; 250/234–236
See application file for complete search history.

(56) References Cited

U.S. PATENT DOCUMENTS

| 4,862,284 | A | 8/1989 | Murata |
| 6,031,633 | A | 2/2000 | Andoh et al. |
| 7,102,797 | B2 * | 9/2006 | Sakai ................... H04N 1/1008 358/406 |

(Continued)

FOREIGN PATENT DOCUMENTS

| JP | 63-117557 | 5/1988 |
| JP | 05-289193 | 11/1993 |
| JP | 2006-238288 | 9/2006 |

OTHER PUBLICATIONS

European Search Report dated Jun. 15, 2015 issued in corresponding European Application No. 15165196.5.

*Primary Examiner* — Cheukfan Lee
(74) *Attorney, Agent, or Firm* — Harness, Dickey & Pierce, P.L.C.

(57) ABSTRACT

An image reading device includes: a moving body that moves to convey at least any of a light source that irradiates a document, a reflecting member that reflects reflected light from the document, and a photoelectric conversion element that performs photoelectric conversion on the reflected light; a driving unit that drives the moving body such that the moving body moves from a stop position to a target stop position in a sub-scanning direction; a detecting unit that is arranged at a position away from the target stop position in the sub-scanning direction, and detects arrival of the moving body; and a control unit that controls the driving unit such that the driving unit is switched from a state of being driven in a synchronizing operation region to a state of being driven in a self-starting region before the detecting unit detects arrival of the moving body.

8 Claims, 8 Drawing Sheets

(51) Int. Cl.
*H04N 1/00* (2006.01)
*H04N 1/047* (2006.01)

(56) References Cited

U.S. PATENT DOCUMENTS

| | | | |
|---|---|---|---|
| 7,782,498 B2 | 8/2010 | Hoshi | |
| 7,800,797 B2* | 9/2010 | Suzuki | H04N 1/0473 |
| | | | 358/406 |
| 7,969,623 B2* | 6/2011 | Kagami | H04N 1/0057 |
| | | | 358/474 |
| 8,305,652 B2* | 11/2012 | Honda | H04N 1/0473 |
| | | | 358/448 |
| 8,643,911 B2* | 2/2014 | Maeda | H04N 1/1017 |
| | | | 358/461 |
| 2006/0193013 A1 | 8/2006 | Hoshi | |
| 2007/0183003 A1 | 8/2007 | Bae | |
| 2008/0074716 A1 | 3/2008 | Yoshihisa | |
| 2013/0077132 A1* | 3/2013 | Sung | H04N 1/401 |
| | | | 358/461 |

\* cited by examiner

IMAGE READING DEVICE, IMAGE FORMING APPARATUS, AND IMAGE READING METHOD

CROSS-REFERENCE TO RELATED APPLICATIONS

The present application claims priority to and incorporates by reference the entire contents of Japanese Patent Application No. 2014-106368 filed in Japan on May 22, 2014.

BACKGROUND OF THE INVENTION

1. Field of the Invention

The present invention relates to an image reading device, an image forming apparatus, and an image reading method.

2. Description of the Related Art

There is a known image reading device that detects a width of a document in a main-scanning direction by using an image sensor for converting image light to an image signal, rather than using a sensor (for example, a photo interrupter) for detecting a width of a document. It is also known that an image reading device, when entering a power-saving state, causes an optical means that transmits reflected light from a document to an image sensor to move to a document-width detection position, and detects a width of a document immediately after returning from the power-saving state.

For example, Japanese Laid-open Patent Publication No. 2006-238288 discloses a document reading device including a power circuit that outputs an operating voltage to each unit of the document reading device in a standby mode and stops the output in a hibernation mode, and including an energy-saving control means that, when switching from the standby mode to the hibernation mode, locates an optical means in a document-width read position and thereafter switches to the hibernation mode.

Further, Japanese Laid-open Patent Publication No. 63-117557 discloses a document reading device that includes an initial position detecting means for detecting an initial position of an optical system, drives a driving means until the initial position detecting means detects the initial position of the optical system, reversely rotates the driving means by a predetermined number of pulses in a self-starting region of the driving means from the initial position upon detection of the initial position by the initial position detecting means, then rotates the driving means in a forward direction in the self-starting region, and stops the driving means upon detection of the initial position of the optical system by the initial position detecting means.

However, conventionally, it is difficult to move a unit including a light source and a mirror to a predetermined position in a sub-scanning direction with high precision at a high speed. For example, when an image reading device returns from a power-saving mode, because a unit including a light source and a mirror is unable to move with high precision at a high speed, even if a user sets a document, the user needs to wait until document reading operation is enabled.

In view of the above circumstances, there is a need for an image reading device, an image forming apparatus, and an image reading method capable of moving a conveying unit, which conveys at least any of a light source, a reflecting member, and a photoelectric conversion element, to a predetermined position with high precision at a high speed.

SUMMARY OF THE INVENTION

It is an object of the present invention to at least partially solve the problems in the conventional technology.

An image reading device performs photoelectric conversion on reflected light from a document to read the document. The image reading device includes: a moving body that moves to convey at least any of a light source that irradiates the document, a reflecting member that reflects the reflected light, and a photoelectric conversion element that performs photoelectric conversion on the reflected light; a driving unit that drives the moving body such that the moving body moves back and forth from a stop position to a target stop position in a sub-scanning direction; a detecting unit that is arranged at a position away from the target stop position by a predetermined set distance in the sub-scanning direction, and detects arrival of the moving body; and a control unit that controls the driving unit such that the driving unit is switched from a state of being driven in a synchronizing operation region to a state of being driven in a self-starting region before the detecting unit detects arrival of the moving body, to move the moving body.

An image reading method reads a document by performing photoelectric conversion on reflected light from the document. The image reading method includes: driving, by a driving unit, a moving body such that the moving body moves from a stop position to a target stop position, the moving body being configured to move to convey at least any of a light source that irradiates the document, a reflecting member that reflects the reflected light, and a photoelectric conversion element that performs photoelectric conversion on the reflected light; detecting, by a detecting unit arranged at a position away from the target stop position by a predetermined set distance in the sub-scanning direction, arrival of the moving body; and controlling the driving unit such that the driving unit is switched from a state of being driven in a synchronizing operation region to a state of being driven in a self-starting region before arrival of the moving body is detected at the detecting, to move the moving body.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

First, the background of the present invention will be described below. An image reading device that reads a document by performing photoelectric conversion on reflected light from the document, needs to move a conveying unit, which conveys a light source, a reflecting mirror, and/or the like, to a predetermined base point (hereinafter, referred to as a home position) in a sub-scanning direction when detecting a width of a document upon returning from a power-saving mode for example. Incidentally, the operation of making movement to the home position and determining an initial value for a driving condition is referred to as homing operation.

When the homing operation is performed by a stepping motor that operates in a self-starting region in order to enable start-up and stop instantly, the conveying unit cannot be moved at a high speed. In contrast, when the homing operation is performed by a stepping motor that operates in a synchronizing operation region in order to move the conveying unit at a high speed, the conveying unit cannot be moved with high precision.

For example, when power is turned on, the conveying unit may be shifted to a position different from a set stop position because of a disturbance factor (mechanical oscillation or the like) during when external power is disconnected. When the conveying unit is moved from the set stop position to a predetermined base point, if a moving distance of the conveying unit is fixed and a stepping motor is operated in a synchronizing operation region, collision or inadequate movement may occur. Further, even when a sensor for detecting movement of the conveying unit to a position close to the predetermined base point is provided, if the stepping motor is operated in the synchronizing operation region, a delay occurs between detection by the sensor and start of control of decelerating the stepping motor.

First Embodiment

Figure 1:
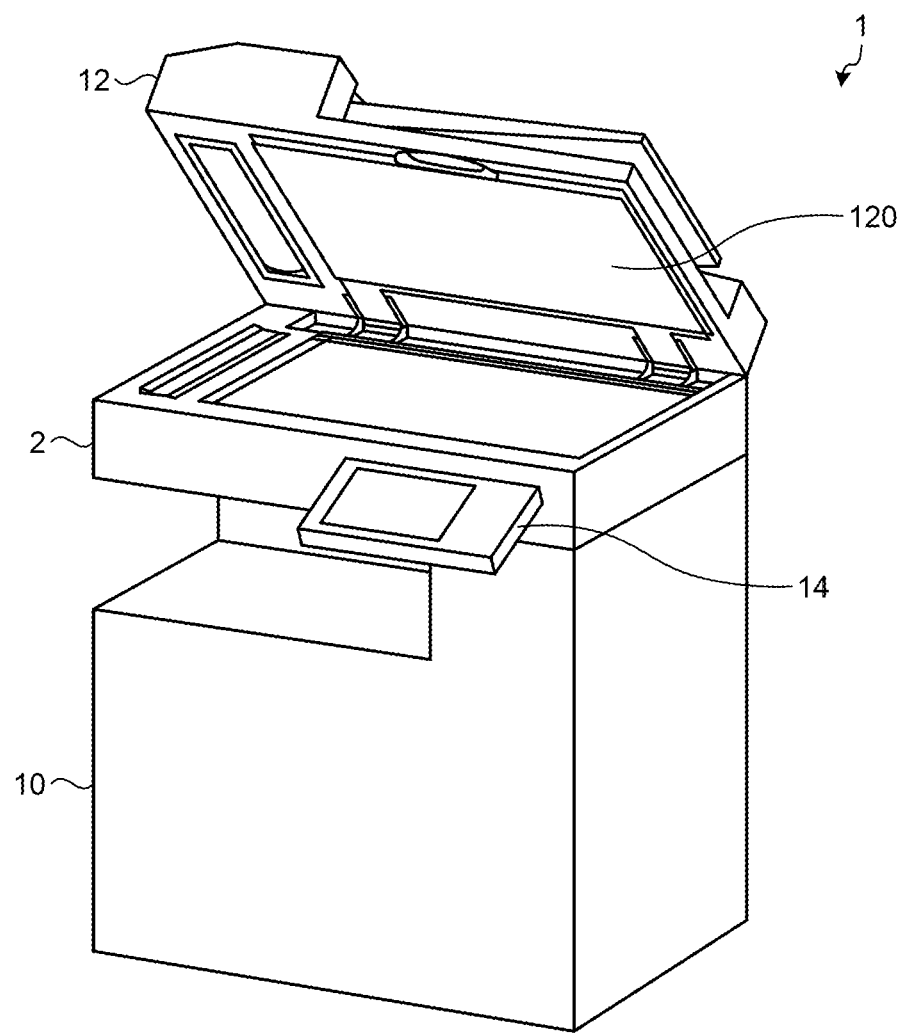
FIG. 1 is a perspective view illustrating an appearance of an image forming apparatus.

Next, an image forming apparatus 1 according to a first embodiment will be described. FIG. 1 is a perspective view illustrating an appearance of the image forming apparatus 1. The image forming apparatus 1 includes, for example, an image forming apparatus main body 10, an image reading device 2, and a document conveying device 12, and is equipped with an operating unit 14, such as a touch panel, at the front. The image forming apparatus 1 prints a document read by the image reading device 2 onto a recording medium, such as a sheet of paper, by using an image forming unit included in the image forming apparatus main body 10.

Figure 2:
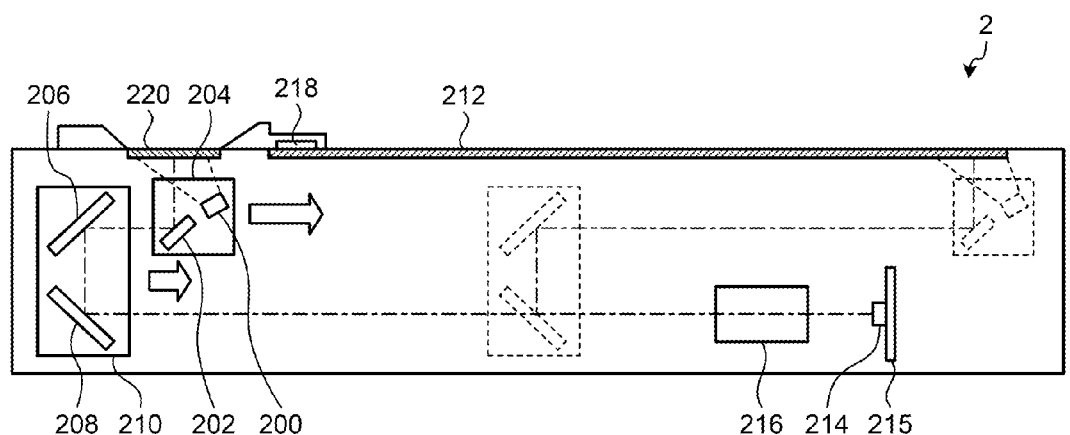
FIG. 2 is a diagram illustrating a configuration of an image reading device of a first embodiment.

FIG. 2 is a diagram illustrating a configuration of the image reading device 2 of the first embodiment. The image reading device 2 is an image reading device of a differential mirror driving system and an optical-sensor-integrated driving system, for example. As illustrated in FIG. 2, the image reading device 2 includes a first mirror unit (moving body) 204 including a light source 200 and a first mirror 202, both ends of which are supported, and includes a second mirror unit 210 including a second mirror 206 and a third mirror 208, both ends of each of which are supported. The light source 200 irradiates a document. Each of the mirrors, such as the first mirror 202, is a reflecting member that further reflects reflected light.

The image reading device 2 further includes an optical lens 216 that focuses reflected light from a document onto a photoelectric conversion element 214, such as a charge coupled device (CCD). The photoelectric conversion element 214 is mounted on a sensor board 215 together with other hardware, for example. The first mirror unit 204 moves in a sub-scanning direction at a constant speed at the time of reading a document. The second mirror unit 210 moves at a half of the speed of the first mirror unit 204 so as to follow the first mirror unit 204, so that a document on a document reading glass 212 is optically scanned.

The document on the document reading glass 212 is irradiated by the light source 200, and an image of the reflected light is guided to the optical lens 216 via the first mirror 202, the second mirror 206, and the third mirror 208, and focused on the photoelectric conversion element 214 by the optical lens 216. The photoelectric conversion element 214 performs photoelectric conversion on the focused image of the reflected light from the document to obtain an analog image signal, and the document is read. A white reference plate 218 is a member colored in white to reflect light emitted by the light source 200 in order to correct a white level. Meanwhile, a mechanism of the image reading device 2 may be of a unit type integrated with a mirror and a photoelectric conversion element or of a type using an equal-magnification sensor (contact image sensor (CIS)) as will be described later.

When sheet documents are automatically read in sequence, the document conveying device 12 conveys the sheet documents onto a sheet-document reading glass 220, and an image of reflected light that passes through the sheet-document reading glass 220 is focused on the photoelectric conversion element 214. At this time, an image of a sheet document being conveyed is read while the first mirror unit 204 and the second mirror unit 210 are fixed. In contrast, when a book document is read, the document conveying device 12 of the image forming apparatus 1 is first opened, the book document is set on the document reading glass 212, the document conveying device 12 is then closed, and a pressure plate portion 120 provided on the document conveying device 12 presses the book document. The reading operation as described above starts when a start key provided on the operating unit 14 is pressed.

Figure 3:
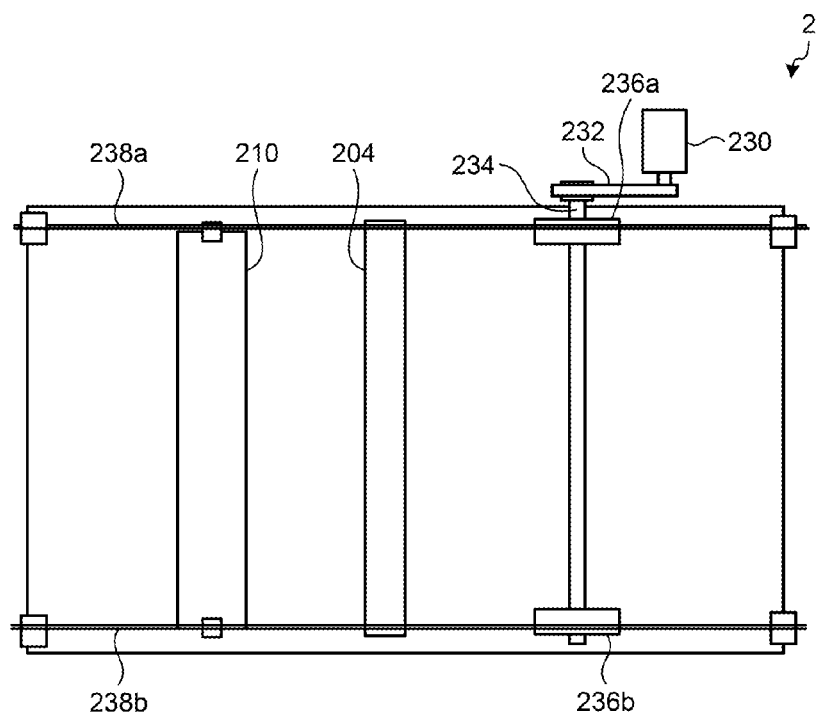
FIG. 3 is a diagram illustrating a driving system of the image reading device.

FIG. 3 is a diagram illustrating a driving system of the image reading device 2. A scanner motor 230 is a stepping motor. When a shaft of the scanner motor 230 rotates, the rotation is transmitted to a shaft 234 via a timing belt 232. Wire pulleys 236a and 236b mounted on the shaft 234 rotate, so that the first mirror unit 204 and the second mirror unit 210 connected to wires 238a and 238b move. At this time, the second mirror unit 210 moves at a half of the speed of the first mirror unit 204. Meanwhile, the driving system of the image reading device 2 may be a system using a timing belt or the like, instead of wires.

Figure 4:
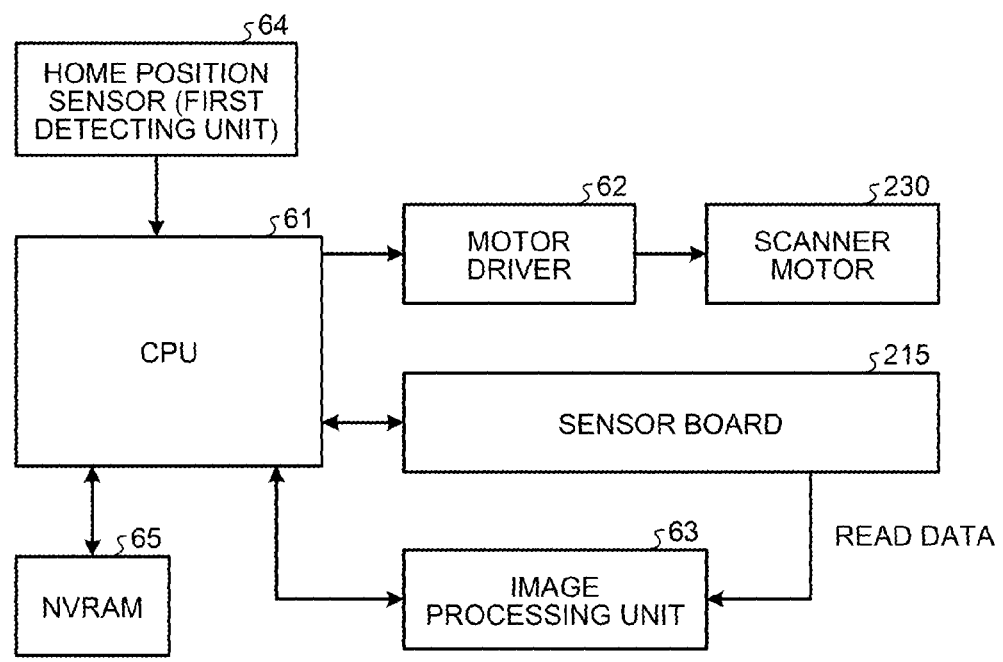
FIG. 4 is a block diagram illustrating an overview of an electrical configuration of the image reading device.

FIG. 4 is a block diagram illustrating an overview of an electrical configuration of the image reading device 2. The image reading device 2 has the electrical configuration as illustrated in FIG. 4 to perform initialization processing, such as the homing operation, adjustment of the characteristics of signal processing on a read image (black level adjustment or white level adjustment).

A central processing unit (CPU) (a control unit) 61 controls each of the units of the image reading device 2, to thereby control the entire operation of the image reading device 2 including an image formation sequence. Further, the CPU 61 receives a position detection signal needed for the homing operation from a home position sensor 64. Then, the CPU 61 controls the scanner motor 230 such that the scanner motor 230 is switched from the state of being driven in a synchronizing operation region to the state of being driven in a self-starting region to be described later, to move the first mirror unit 204.

A motor driver 62 drives the scanner motor (a driving unit) 230 that drives the first mirror unit 204 and the second mirror unit 210. The sensor board 215 includes the photoelectric conversion element 214 mounted thereon, and outputs read image data to an image processing unit 63.

The image processing unit 63 performs digital processing on the read image data output by the sensor board 215. For example, the image processing unit 63 performs image correction processing, such as shading processing, gamma correction processing, magnification change processing, or filtering processing, needed to perform output processing, such as drawing processing, on digital data of the read image input from the sensor board 215. Further, in addition to outputting an image signal to the image forming apparatus main body 10 that performs print output processing, the image processing unit 63 detects, from the input digital image data, black level data and white level data needed to obtain an adjustment value used for clamp and gain correction on the sensor board 215, an outputs detected values to the CPU 61 for feedback operation.

The home position sensor (a first detecting unit) 64 is, for example, a photo interrupter, and outputs a position detection signal for detecting a position of the first mirror unit 204 as will be described later. An NVRAM (a nonvolatile storage unit) 65 stores therein data needed to control the initialization processing.

Figure 5:
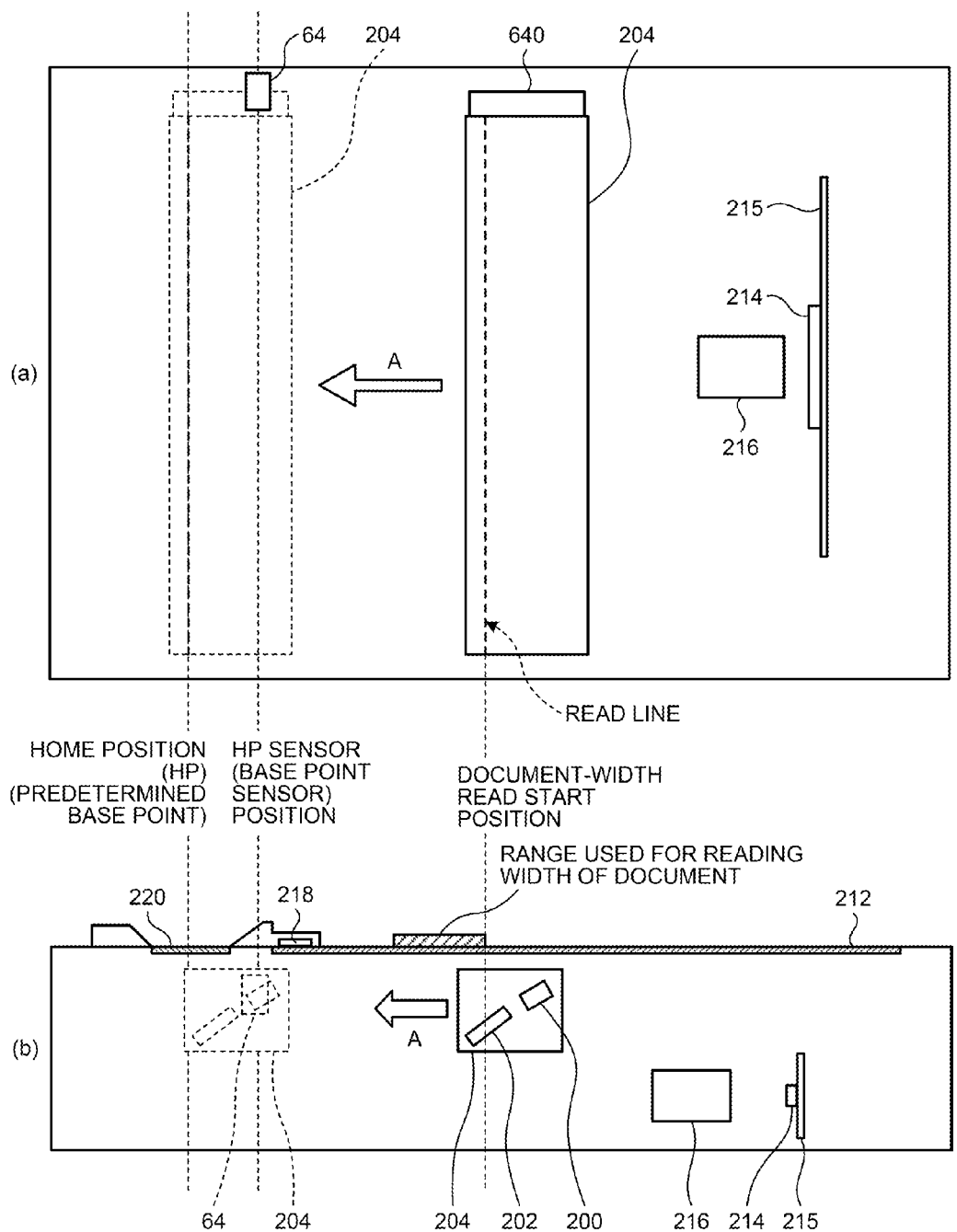
FIG. 5 is a diagram illustrating operation of detecting a width of a document by the image reading device.

Next, operation of detecting a width (size) of a document by the image reading device 2 will be described. FIG. 5 is a diagram illustrating the operation of detecting a width of a document by the image reading device 2. The image reading device 2 viewed from above is illustrated at (a) in FIG. 5, and the image reading device 2 viewed from a side is illustrated at (b) in FIG. 5. In FIG. 5, the second mirror unit 210 is not illustrated for the simplicity sake. When the power is turned on or when returning from a power-saving mode, the image reading device 2 detects a width of a document by using the photoelectric conversion element 214 while moving the first mirror unit 204.

When the power of the image reading device 2 is turned on or when the pressure plate portion 120 is changed from an open state to a closed state, the first mirror unit 204 waiting at a document-width read start position (a standby position or a stop position) moves by a predetermined distance toward a home position (HP) (in the direction of an arrow A) at a sub-scanning start position, while reading a width of a document. The home position sensor 64 as described above is provided on an inner side surface of a housing of the image reading device 2, for example.

The home position sensor 64 includes a slit (not illustrated), and is configured to set a position detection signal for detecting a position of the first mirror unit 204 in the sub-scanning direction to ON when a filler 640 provided on an end of the first mirror unit 204 is inserted in the slit. The home position sensor 64 performs detection such that the position detection signal is set to OFF until the first mirror unit 204 reaches the home position sensor 64 from the document-width read start position, and the position detection signal is set to ON after the first mirror unit 204 reaches the home position sensor 64 (in a range beyond the home position sensor 64). The home position sensor 64 is arranged at a position away from the home position (a predetermined base point: a target stop position) by a predetermined set distance in the sub-scanning direction, and may be described as a base point sensor.

Incidentally, the image reading device 2 is configured to move the first mirror unit 204 to the document-width read start position at a timing of shift to a power-saving mode in which power consumption is reduced. Further, the image reading device 2 performs the homing operation to accurately determine the positions of the first mirror unit 204 and the second mirror unit 210 in the sub-scanning direction after the first document-width read start operation since returning from the power-saving mode.

Figure 6:
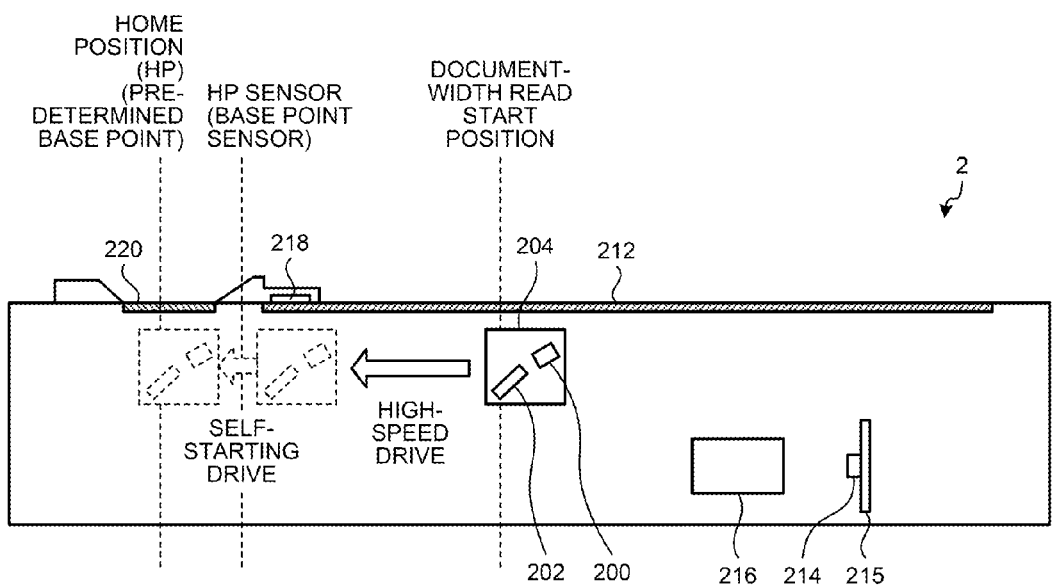
FIG. 6 is a diagram illustrating operation of determining a predetermined base point by the image reading device.

FIG. 6 is a diagram illustrating operation (homing operation) of determining the home position (predetermined base point) by the image reading device 2 by moving the first mirror unit 204 toward the sub-scanning start position. The image reading device 2 performs the homing operation when the power is turned on, when returning from the power-saving mode because the document conveying device 12 (the pressure plate portion 120) is changed from the open state to the closed state, or when the power-saving mode is cancelled through the operating unit 14.

The image reading device 2 performs the homing operation in two stages of high-speed drive and self-starting drive. Herein, the high-speed drive is to drive the scanner motor 230 in a slew region (the synchronizing operating region: the region outside the self-starting region). In the synchronizing operation region, speed-up and slow-down control is performed. Further, the self-starting drive is to drive the scanner motor 230 in the self-starting region. The self-starting region is a region in which start-up, stop, rotation, and reverse rotation are instantly possible in synchronization with an input pulse signal.

Specifically, the image reading device 2 drives, by the high-speed drive, the scanner motor 230 until just before the first mirror unit 204 reaches the above described home position sensor 64 (base point sensor), and moves the first mirror unit 204 and the like by a predetermined distance from the document-width read start position. Thereafter, the image reading device 2 causes the scanner motor 230 to switch to the self-starting drive to enable the first mirror unit 204 to stop instantly. Namely, the image reading device 2, when moving the first mirror unit 204 in a single direction, switches a driving operation mode between two stages to enable the first mirror unit 204 to stop at the home position with high precision in a short time after the first mirror unit 204 reaches the home position sensor 64.

Figure 7:
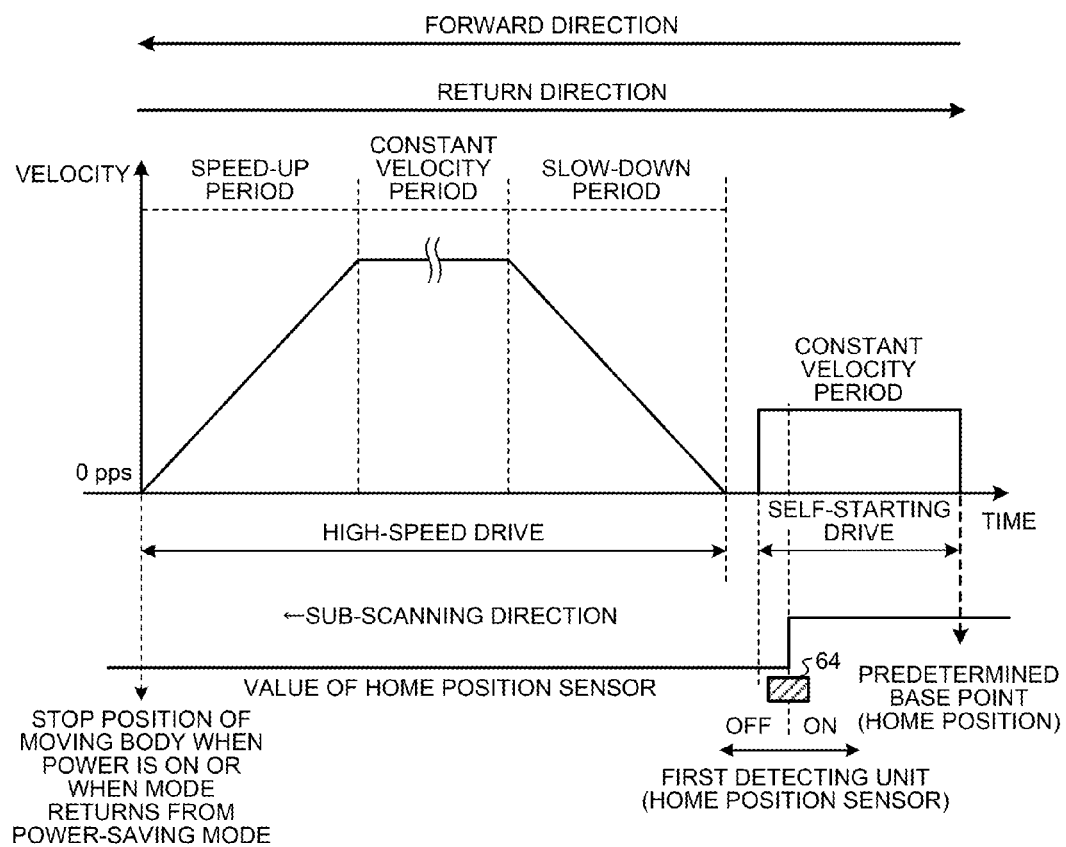
FIG. 7 is a velocity diagram illustrating a velocity at which the image reading device moves a first mirror unit.

FIG. 7 is a velocity diagram illustrating a velocity at which the image reading device 2 moves the first mirror unit 204 when the image reading device 2 detects (determines) the home position (a velocity diagram of the homing operation). As illustrated in FIG. 7, in the high-speed drive of the first mirror unit 204, the image reading device 2 first performs speed-up operation, maintains a constant velocity, and performs slow-down operation just before the first mirror unit 204 reaches the home position sensor 64, to, for example, temporarily stop the first mirror unit 204. The first mirror unit 204 may be switched from the state of being moved in the high-speed drive to the state of being moved in the self-starting drive without being temporarily stopped. Then, the image reading device 2 switches a driving mode from the high-speed drive to the self-starting drive before the home position sensor 64.

The image reading device 2 enables the first mirror unit 204 to instantly stop by switching the driving mode for the first mirror unit 204 from the high-speed drive to the self-starting drive. Then, the image reading device 2 moves the first mirror unit 204 by the self-starting drive to the predetermined base point (home position) located at a predetermined distance from the home position sensor 64; therefore, it is possible to stop the first mirror unit 204 with high precision in a short time.

Meanwhile, the reasons why the image reading device 2 does not perform the homing operation by using only the high-speed drive includes the following. To stop the first mirror unit 204 at the predetermined base point (home position) by high-speed operation, it is necessary to slow down the first mirror unit 204 before the predetermined base point.

For example, if slow-down is performed by using a detection result of the home position sensor (base point sensor) 64 as a trigger, a delay (time difference) occurs from when the home position sensor 64 is turned on until the slow-down is started, so that the first mirror unit 204 cannot be stopped at a predetermined position (target position) with high precision. Further, if the scanner motor 230 is stopped when the first mirror unit 204 reaches the home position sensor 64, the first mirror unit 204 moves to a position beyond the predetermined position (target position) due to the inertia force.

Figure 8:
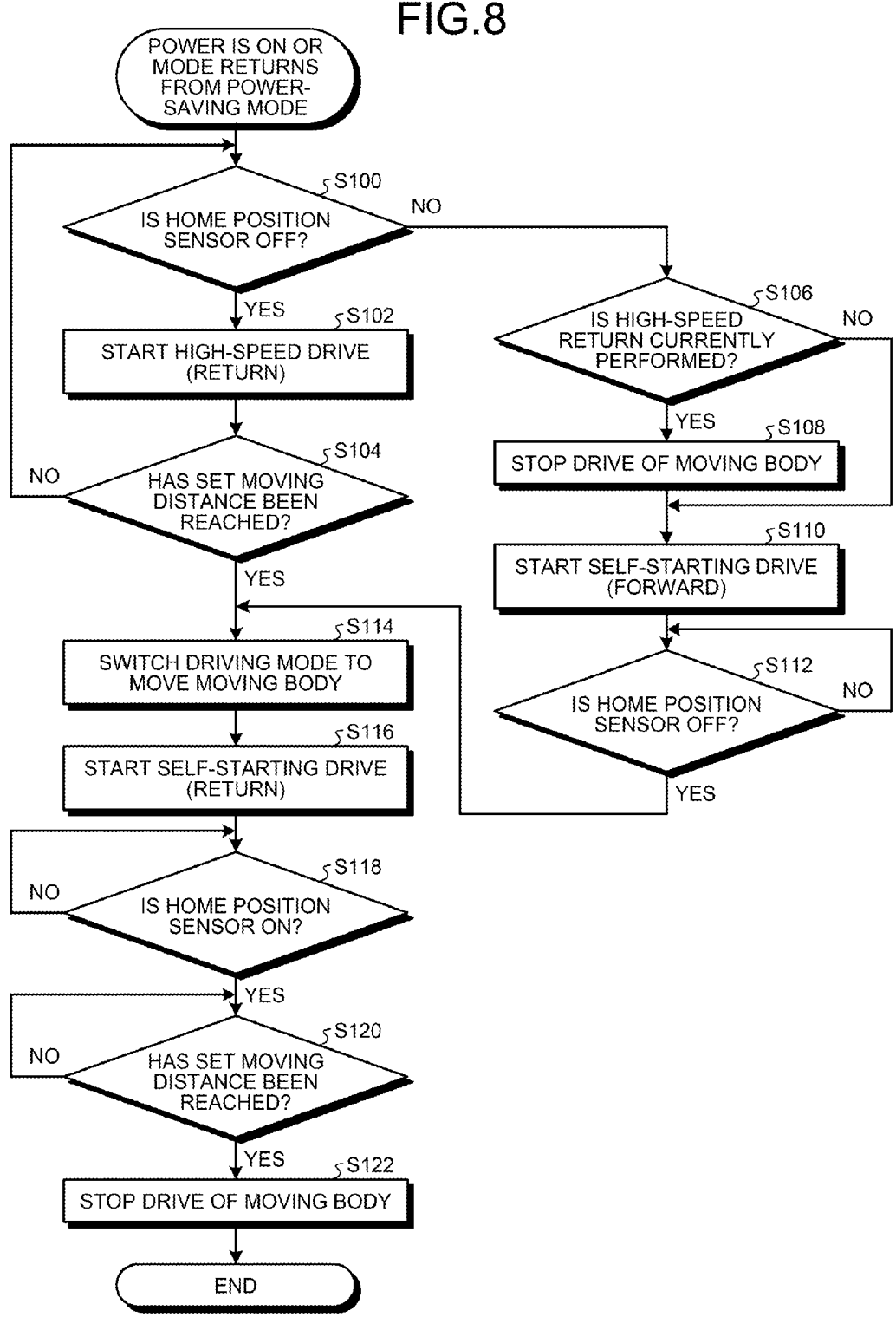
FIG. 8 is a flowchart illustrating a process performed by the image reading device to determine a home position.

FIG. 8 is a flowchart illustrating a process performed by the image reading device 2 to move the first mirror unit 204 toward the sub-scanning start position to determine the home position (predetermined base point). The image reading device 2 performs the process illustrated in FIG. 8 when the power is turned on or when returning from the power-saving mode, for example.

The image reading device 2, when the power is turned on or when returning from an energy-saving mode (power-saving mode) in which power consumption is reduced, determines whether the home position sensor 64 is OFF (S100). If the home position sensor 64 is OFF (YES at S100), the process by the image reading device 2 proceeds to S102. If the home position sensor 64 is not OFF (NO at S100), the process by the image reading device 2 proceeds to S106.

If the first mirror unit 204 is stopped at a position at which the home position sensor 64 is OFF, the image reading device 2 starts the high-speed drive and moves (returns) the first mirror unit 204 toward the home position in a direction opposite to the sub-scanning direction at a high speed (S102).

The image reading device 2 determines whether the first mirror unit 204 has reached a predetermined moving distance (first set moving distance) from a position at which the first mirror unit 204 had stopped (S104). If the image reading device 2 determines that the first mirror unit 204 has reached the set moving distance (YES at S104), the process proceeds to S114. If the image reading device 2 determines that the first mirror unit 204 has not reached the set moving distance (NO at S104), the process returns to S100.

In contrast, if the first mirror unit 204 is not stopped at the position at which the home position sensor 64 is OFF, the image reading device 2 determines whether the high-speed drive (high-speed return drive) is currently performed (S106). If the image reading device 2 determines that the high-speed return is currently performed (YES at S106), the process proceeds to S108. If the image reading device 2 determines that the high-speed return is not currently performed (NO at S106), the process proceeds to S110.

In the process at Step S108, the image reading device 2 stops the drive of the first mirror unit (moving body) 204.

In the process at S110, the image reading device 2 starts the self-starting drive and moves the first mirror unit 204 toward the home position in such a way that the first mirror unit 204 can be stopped instantly (S110). For example, the image reading device 2 moves the first mirror unit 204 in a forward direction (see FIG. 7).

In the process at S112, the image reading device 2 determines whether the home position sensor 64 is OFF. If the home position sensor 64 is OFF (YES at S112), the process by the image reading device 2 proceeds to S114. If the home position sensor 64 is not OFF (NO at S112), the image reading device 2 repeats the process at S112.

In the process at S114, the image reading device 2 switches the driving mode to move the first mirror unit (moving body) 204.

In the process at S116, the image reading device 2 starts the self-starting drive, and moves (returns) the first mirror unit 204 toward the home position in a direction opposite to the sub-scanning direction in such a way that the first mirror unit 204 can be stopped instantly.

In the process at S118, the image reading device 2 determines whether the home position sensor 64 is ON. If the home position sensor 64 is ON (YES at S118), the process by the image reading device 2 proceeds to S120. If the home position sensor 64 is not ON (NO at S118), the image reading device 2 repeats the process at S118.

The image reading device 2 determines whether the first mirror unit 204 has reached a moving distance (second set moving distance), which is determined in advance as a distance to the home position, from a position at which the first mirror unit 204 had stopped (S120). If the image reading device 2 determines that the first mirror unit 204 has reached the second set moving distance (YES at S120), the process proceeds to S122. If the image reading device 2 determines that the first mirror unit 204 has not reached the second set moving distance (NO at S120), the image reading device 2 repeats the process at S120.

In the process at S122, the image reading device 2 stops the drive of the first mirror unit (moving body) 204.

Namely, if the home position sensor 64 detects arrival of the first mirror unit 204 before the first mirror unit 204 moves a set distance, the image reading device 2 stops driving the scanner motor 230. Further, if the home position sensor 64 detects arrival of the first mirror unit 204 when the first mirror unit 204 starts to move, the image reading device 2 performs control to drive the scanner motor 230 in the self-starting region without driving the scanner motor 230 in the synchronizing operation region.

In this manner, the image reading device 2 moves the first mirror unit 204 while switching the scanner motor 230 between the self-starting region and the synchronizing operation region; therefore, it is possible to move the first mirror unit 204 to a predetermined position with high precision at a high speed.

Figure 9:
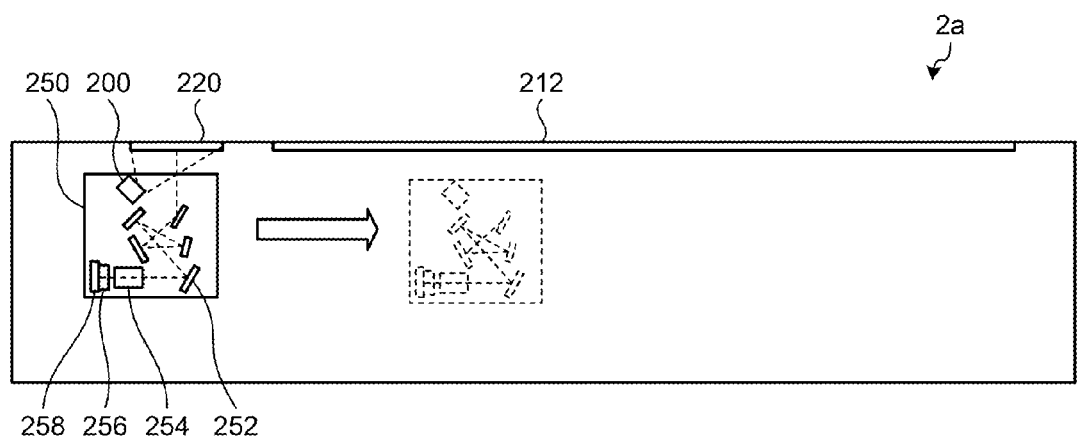
FIG. 9 is a diagram illustrating a configuration of an image reading device of a second embodiment.
Figure 10:
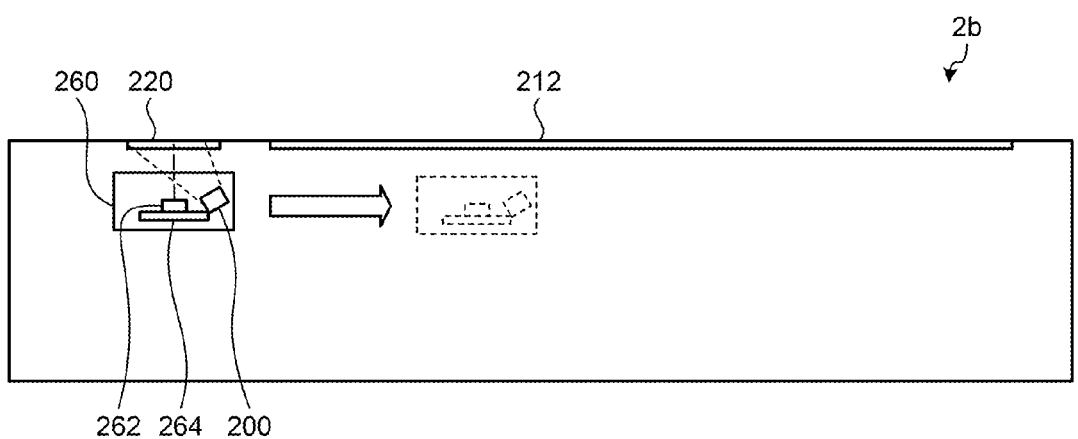
FIG. 10 is a diagram illustrating a configuration of an image reading device of a third embodiment.

Incidentally, the configuration of the image reading device is not limited to the configuration as described above. FIG. 9 is a diagram illustrating a configuration of the image reading device 2 (an image reading device 2*a*) of a second embodiment. FIG. 10 is a diagram illustrating a configuration of the image reading device 2 (an image reading device 2*b*) of a third embodiment. The image reading device 2*a* is a unit-type (integrated Md type) image reading device, in which the light source 200, a mirror group 252 including a plurality of mirrors, an optical lens 254, a photoelectric conversion element 256, and a sensor board 258 are provided in a moving body 250. The image reading device 2*b* is a CIS-type image reading device, in which the light source 200, an equal-magnification sensor 262, and a sensor board 264 are provided in a moving body 260. Even in the image reading device 2*a* and the image reading device 2*b*, by moving a moving body while switching the motor between the self-starting region and the synchronizing operation region, it is possible to move the moving body to a predetermined position with high precision at a high speed.

According to an embodiment of the present invention, it is possible to move a conveying unit, which conveys at least any of a light source, a reflecting member, and a photoelectric conversion element, to a predetermined position with high precision at a high speed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading device that performs photoelectric conversion on reflected light from a document to read the document, the image reading device comprising:
   a moving body configured to move to convey at least one of a light source that irradiates the document, a reflecting member that reflects the reflected light, and a photoelectric conversion element that performs photoelectric conversion on the reflected light;
   a driver configured to drive the moving body such that the moving body moves back and forth from a stop position to a target stop position in a sub-scanning direction;
   a detector positioned away from the target stop position by a distance in the sub-scanning direction, the detector configured to detect an arrival of the moving body; and
   a controller configured to control the driver such that the driver is switched from a state of being driven in a synchronizing operation region to a state of being driven in a self-starting region before the detector detects the arrival of the moving body, to move the moving body.

2. The image reading device according to claim 1, wherein the controller is configured to control the driver such that the driver is switched from the state of being driven in the synchronizing operation region to the state of being driven in the self-starting region to move the moving body when power is turned on or when returning from an energy-saving mode in which power consumption is reduced.

3. The image reading device according to claim 1, wherein the controller is configured to cause the driver to move the moving body while detecting a width of the document using the photoelectric conversion element.

4. The image reading device according to claim 1, wherein the controller is configured to cause the driver to temporarily stop while the driver switches from the synchronizing operation region to the self-starting region.

5. The image reading device according to claim 1, wherein the controller is configured to stop driving the driver, if the detector detects the arrival of the moving body before the moving body moves the distance.

6. The image reading device according to claim 1, wherein, the controller is configured to control the driver such that the driver is driven in the self-starting region without being driven in the synchronizing operation region, if the detector detects the arrival of the moving body when the moving body starts to move.

7. An image forming apparatus comprising:
   the image reading device according to claim 1; and
   an image forming unit configured to form an image read by the image reading device on a recording medium.

8. An image reading method of reading a document by performing photoelectric conversion on reflected light from the document, the image reading method comprising:
   driving, by a driver, a moving body such that the moving body moves from a stop position to a target stop position in a sub-screening direction, the moving body being configured to move to convey at least one of a light source that irradiates the document, a reflecting member that reflects the reflected light, and a photoelectric conversion element that performs photoelectric conversion on the reflected light;
   detecting, by a detector positioned away from the target stop position by a distance in the sub-scanning direction, an arrival of the moving body; and
   controlling, by a controller, the driver such that the driver is switched from a state of being driven in a synchronizing operation region to a state of being driven in a self-starting region before the arrival of the moving body is detected at the detecting, to move the moving body.

* * * * *